United States Patent [19]
Iishiba et al.

[11] Patent Number: 5,500,745
[45] Date of Patent: Mar. 19, 1996

[54] IMAGE READING DEVICE CAPABLE OF PERFORMING SHADING CORRECTION

[75] Inventors: Fumio Iishiba; Shinji Ishida; Masatoshi Ikeda, all of Mie; Kunihiro Takahashi, Kanagawa, all of Japan

[73] Assignee: Fuji Xerox Co., Ltd., Tokyo, Japan

[21] Appl. No.: 162,975

[22] Filed: Dec. 8, 1993

Related U.S. Application Data

[63] Continuation of Ser. No. 832,346, Feb. 7, 1992, abandoned.

[30] Foreign Application Priority Data

Feb. 15, 1991 [JP] Japan .................................. 3-022206

[51] Int. Cl.$^6$ .................................................... H04N 1/40
[52] U.S. Cl. .................................................... 358/461
[58] Field of Search .................................... 358/461, 464

[56] References Cited

U.S. PATENT DOCUMENTS

| | | | |
|---|---|---|---|
| 4,520,395 | 5/1985 | Abe | 358/461 |
| 4,760,464 | 7/1988 | Sakano | 358/461 |
| 4,806,780 | 2/1989 | Yamamoto et al. | 358/461 |
| 4,829,379 | 5/1989 | Takaki | 358/461 |
| 5,062,144 | 10/1991 | Murakami | 358/461 |

FOREIGN PATENT DOCUMENTS 63-9279  1/1988  Japan .

*Primary Examiner*—Curtis Kuntz
*Assistant Examiner*—Ping W. Lee
*Attorney, Agent, or Firm*—Finnegan, Henderson, Farabow, Garrett & Dunner

[57] ABSTRACT

A digitized image data produced by reading a certain scanning line portion of a shading correction plate by an image sensor is stored in a buffer memory as digital data B. A digital comparator compares, on a pixel-by-pixel basis, the digital data B with new digital data A produced by reading another scanning line portion apart from the above portion by a distance of a plurality of scanning lines. This comparison is repeated while the reading line portion on the correction plate is changed until a difference between the data B and the new data A becomes smaller than a predetermined value for all the pixels. The data of one scanning line finally stored in the buffer memory is transferred to a shading correction data memory.

14 Claims, 7 Drawing Sheets

IMAGE READING DEVICE CAPABLE OF PERFORMING SHADING CORRECTION

This application is a continuation of application Ser. No. 07/832,346, filed Feb. 7, 1992, now abandoned.

BACKGROUND OF THE INVENTION

The present invention relates to an image reading device. More specifically, the invention relates to an image reading device capable of storing in a memory reference data for shading correction which is hardly affected by a scratch or stain on a correction plate.

In image reading devices used in facsimile machines, digital copiers, etc., an analog image signal produced by an image sensor consisting of photoelectric conversion elements such as CCDs (charge-coupled devices) is converted into a digital image signal by an A/D converter. However, such image reading devices are accompanied by an undesirable phenomenon that an output image is deteriorated due to uneven illumination by a light source, characteristics of a lens system, non-uniformity in the sensitivity of the photoelectric conversion elements, and other factors. Therefore, shading correction required to maintain high quality output images.

The shading correction in an image reading device performed in the following manner. In order to produce an output to be used as correction reference data, a white document (i.e., a collection plate) is prepared. Placed at a predetermined position, the correction plate is read by an image sensor to produce an analog signal of one line. The analog signal is converted by an A/D converter into an digital signal, which is stored into a RAM. In subsequent reading of real documents, digital data stored in the RAM is read out so as to be used as the correction reference data for image data.

However, in conventional image reading devices, if a scratch or stain exists at, or foreign matter such as dust is attached to the reading position of the correction plate, desired correction data cannot be obtained, preventing accurate shading correction. FIG. 9 exemplifies such a situation. If pieces of dust 42 or the like are attached to a correction plate 41 at its reading positions, shading correction reference data Ds having lower level portions corresponding to the dust positions is stored. Even if smooth reading output data Tr is produced by reading a document having a certain density, peak levels N called "streak noise" appear in output data Da after the shading correction, resulting in an output image deterioration.

SUMMARY OF THE INVENTION

The present invention has been made in consideration of the above problem of the prior art and, therefore, an object of the invention is to provide an image reading device which can obtain proper correction reference data for shading correction by eliminating the influence of a scratch, dust, etc. existing on a correction plate.

According to the invention, an image reading device comprises:

a shading correction plate;

means for reading the shading correction plate to produce an analog image signal for shading correction;

means for converting the analog image signal into a digital signal;

means for storing the digital signal;

means for comparing, on a pixel-by-pixel basis, a first digital signal of one scanning line stored in the storing means with a second digital signal of a following scanning line apart from the scanning line of the first digital signal by a distance of a plurality of scanning lines; and first judging means for judging whether a difference between the first and second digital signals is smaller than a predetermined value for all of pixels;

wherein the comparison by the comparing means is repeated while a reading line on the correction plate is changed until a judgment result of the first judging means becomes affirmative.

DESCRIPTION OF THE PREFERRED EMBODIMENTS

A first embodiment of the present invention is described with reference to FIGS. 1–6.

Figure 5:
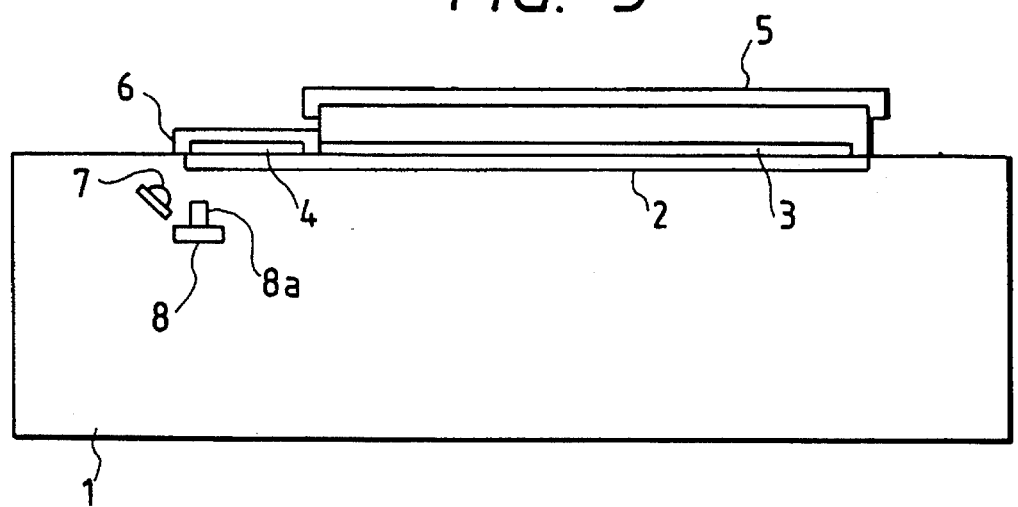
FIG. 5 is a schematic diagram showing the image reading device.

As shown in FIG. 5, a platen glass plate 2 is disposed in the upper portion of a main body 1 of an image reading device. A document 3 and a correction plate 4 to be used for producing reference data for shading correction are placed, in close contact, on the upper surface of the platen glass plate 2. While the document 3 is covered with a platen cover 5, the correction plate 4 is shielded from external light with a correction plate cover 6. A carriage (not shown), capable of reciprocating movement in the sub-scanning direction (right-left direction in FIG. 5), is disposed below the platen glass plate 2. A light source 7 consisting of an array of light-emitting diodes (LEDs), an image sensor 8, etc. are mounted on the carriage. The image sensor 8 may be of the contact type having photoelectric conversion elements in the form of amorphous silicon sensors. The image sensor 8 receives, via a rod lend array 8a, light emitted by the light source 7 and then reflected from the document 3, and photoelectrically converts the received light into an analog image signal, which is provided to an amplifier 9 (see FIG. 2).

Figure 1:
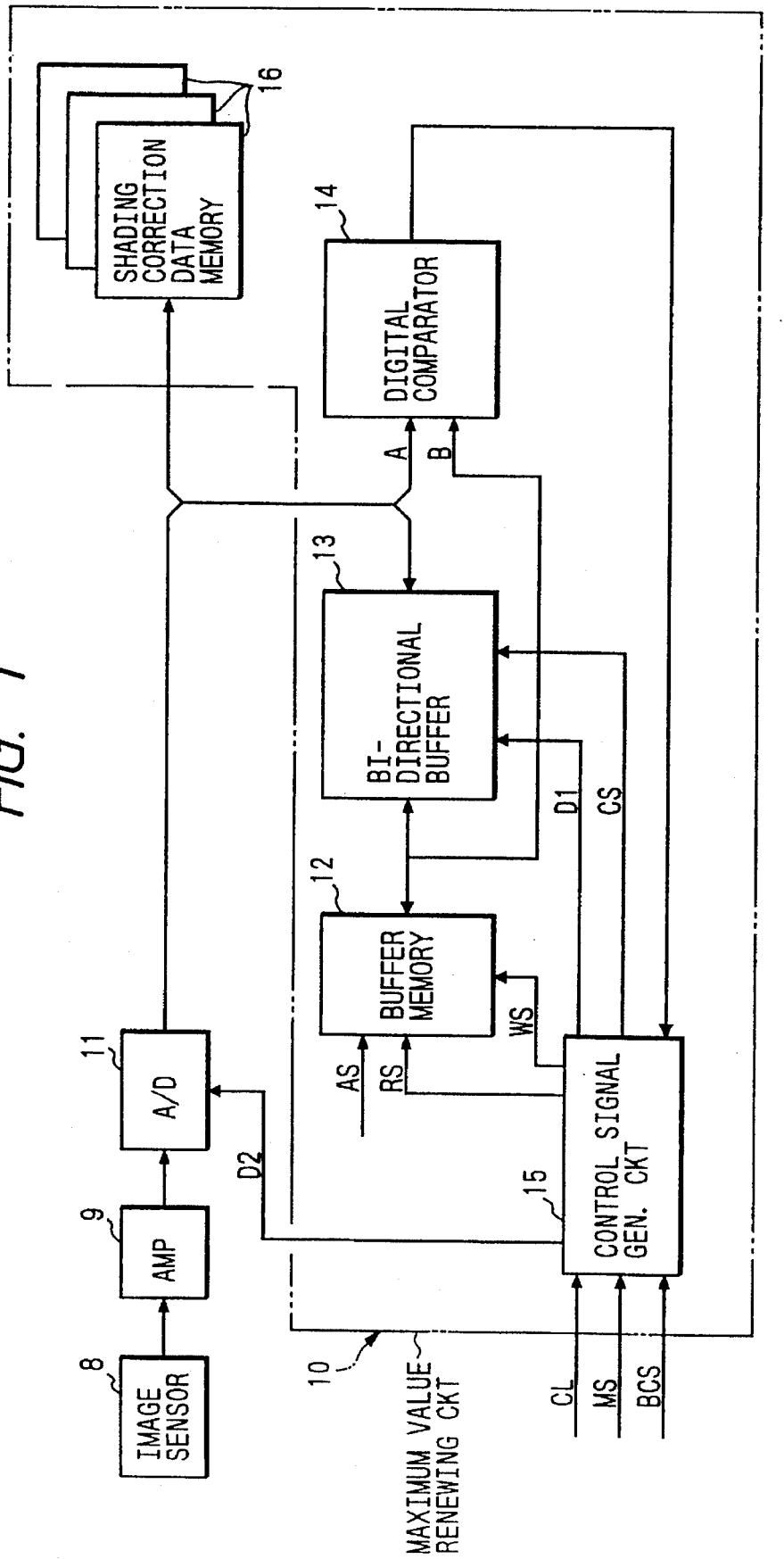
FIG. 1 is a block diagram showing the main part of a circuit configuration of an image reading device according to a first embodiment of the invention.

Referring to FIG. 1, a maximum value renewing circuit for taking in the most suitable correction reference data for shading correction consists of a buffer memory 12 which receives an output of an A/D converter 11, a bi-directional buffer 13, a digital comparator 14, a control signal generating circuit 15 and shading correction data memory 16. The A/D converter 11 converts the analog image signal from the amplifier 9 into a digital signal of n bits (e.g., 8 bits). Data produced from the A/D converter 11 is written into and then read from the buffer memory 12. That is, the buffer memory 12 temporarily stores the output data of the A/D converter 11. The bi-directional buffer 13 not only controls output-on/off of data but also changes the direction of its flow in accordance with an instruction signal from the control signal generating circuit 15. The digital comparator 14 compares the output data A of the A/D converter 11 with the output data B of the buffer amplifier 12 on a pixel-by-pixel basis, and provides a result of the comparison to the control signal generating circuit 15 when the data A is larger than the data B. The control signal generating circuit 15 generates an output-on/off changeover signal D2 for the A/D converter 11, a data write signal WS and a data read signal RS for the buffer memory 12, and an output-on/off signal D1 and a direction changeover signal CS for the bi-directional buffer 13 on the basis of the output of the digital comparator 14 and a mode changeover signal MS and a bi-directional buffer changeover signal BCS, etc. from a CPU (not shown). Data of the buffer memory 12, which has been subjected to the maximum value renewal, is written into the shading correction data memory 16. The bi-directional buffer 13 and the control signal generating circuit 15 constitute a means for rewriting the data stored in the buffer memory 12 and a means for transferring the data stored in the buffer memory 12 to the shading correction data memory 16. Additional shading correction data memories 16 can be provided when necessary. More specifically, while one memory is enough to perform the shading correction only for white (bright correction), additional memories are required to perform the shading correction for black (dark correction) and gray (halftone correction) as well as white. In this case, the number of the additional shading correction data memories depends on the type of the shading correction.

Figure 2:
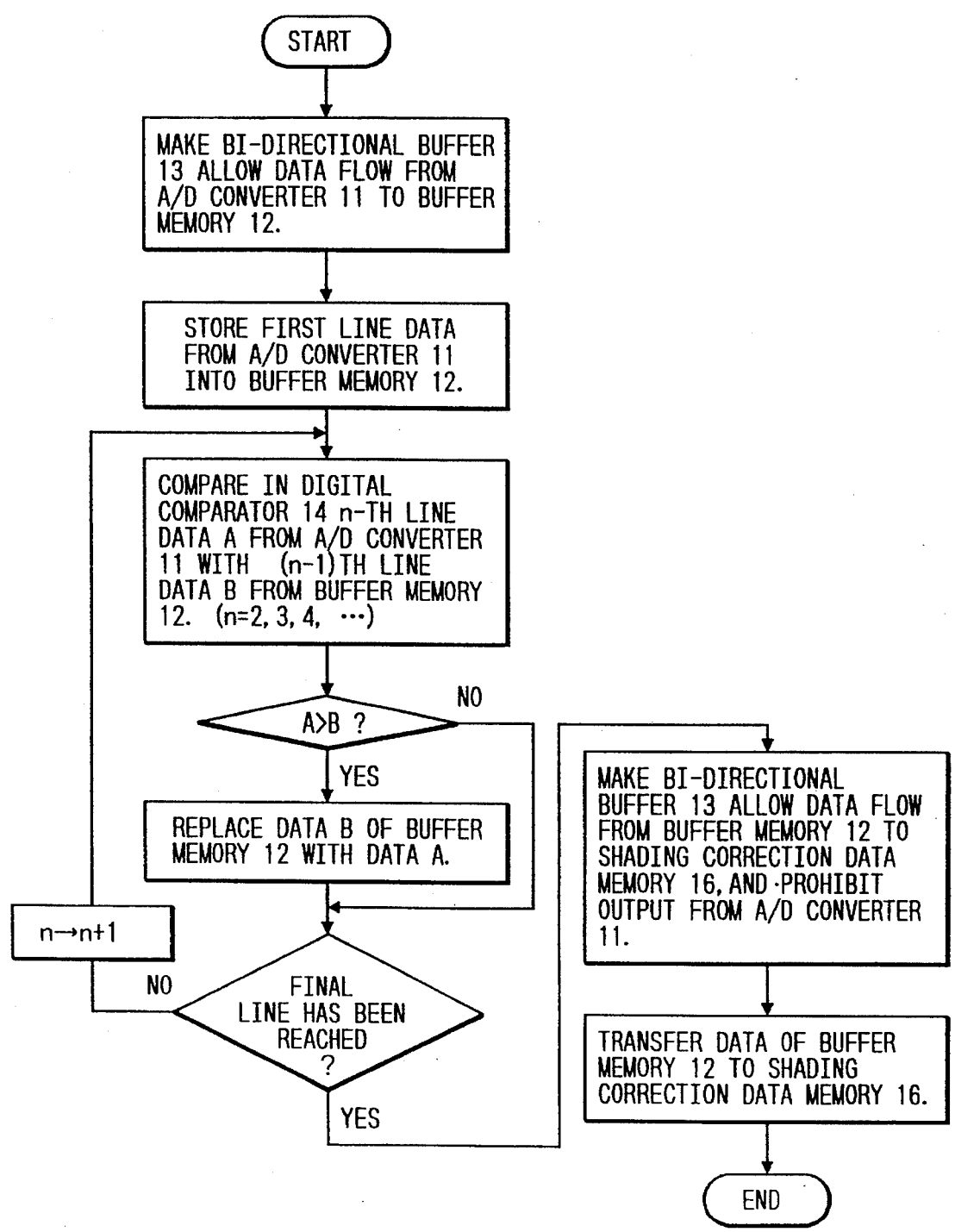
FIG. 2 is a flowchart showing an operation of taking in shading correction reference data.

The operation of the above-constructed device is described with reference to FIG. 2. In the initial state, the A/D converter 11 is on, and the bi-directional buffer 13 is set so as to allow the data flow from the A/D converter 11 to the buffer memory 12, and to prohibit its own output. In order to take in white reference data, the carriage is moved to the prescribed position at which the image sensor 8 faces the correction plate 4. Based on an externally provided clock CL and the mode changeover signal MS from the CPU, the control signal generating circuit 15 provides the write signal WS to the buffer memory 12, and the output-on signal D1 to the bi-directional buffer 13, which enables the output data of the A/D converter 11 to be written into the buffer memory 12. In this state, the image sensor 8 reads the first line of the correction plate 4 in the main scanning direction. An analog signal produced from the image sensor 8 is input via the amplifier 9 to the A/D converter 11, where it is converted into a digital signal. The output data of the A/D converter 11 is sequentially written into the buffer memory 12 at its addresses specified by an address signal AS.

After reading the first line, the carriage is moved in the sub-scanning direction by a one-line distance so that the image sensor 8 faces the second line of the correction plate 4. In this state, the second line is read by the image sensor 8. At the same time, the output data A of the A/D converter 11 and the first line data B stored in the buffer memory are input to the digital comparator 14, and sequentially compared therein for all the pixels (addresses). Then, with respect to an address associated with the data B satisfying the relationship A>B, the data B of the buffer memory 12 is replaced by the second line data A.

Figure 3A:
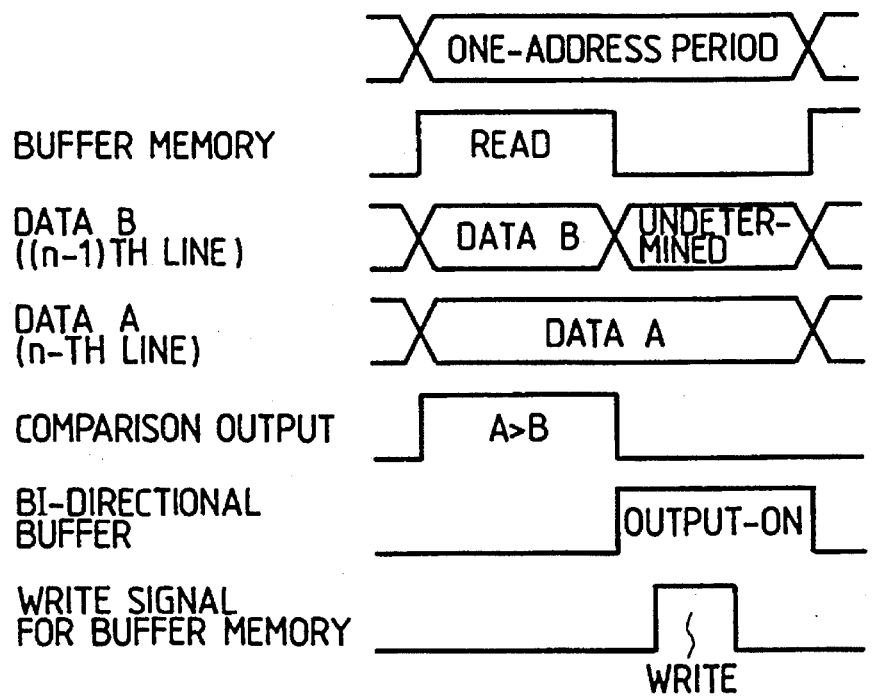
FIGS. 3(a) and 3(b) are timing charts showing the timing of data comparison and writing.
Figure 3B:
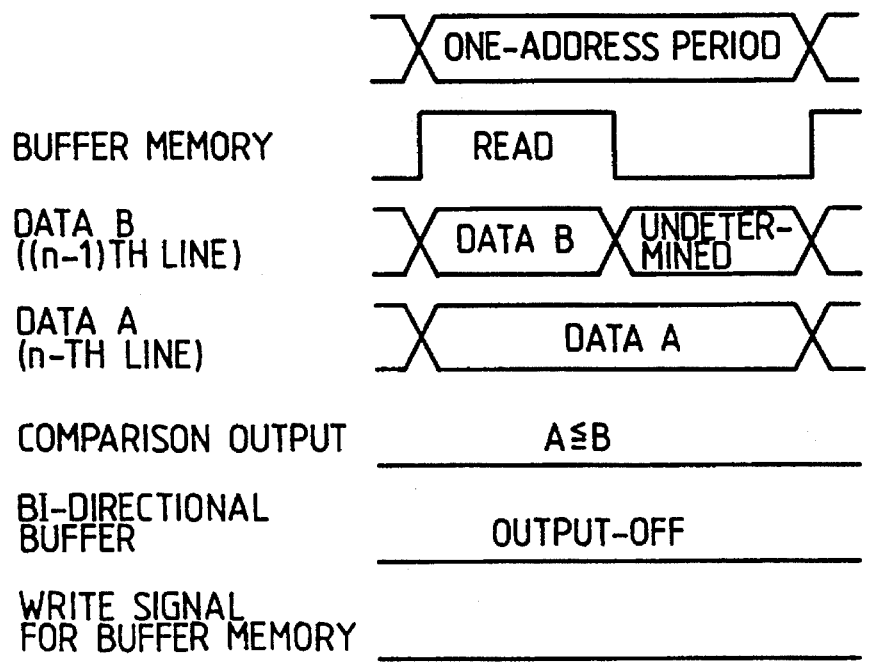

The comparison between the data A and B and the data replacement are performed at the timing shown in FIGS. 3(a) and 3(b). During the first half of a one-address period, the first line data B is read from the buffer memory 12 and input to the digital comparator 14, where it is compared with the second line data A. As shown in FIG. 3(a), if A>B, a comparison output indicating the relationship A>B is provided to the control signal generating circuit 15 during the first half of the one-address period. Upon reception of the comparison output indicating A>B, during the second half of the one-address period the control signal generating circuit 15 provides the output-on signal D1 to the bi-directional buffer 13, and the write signal WS to the buffer memory 12. As a result, the second line data A is written into the buffer memory 12 at its selected addresses during the second half of the one-address period. On the other hand, as shown in FIG. 3(b), if A≦B, a comparison output indicating the relationship A≦B is provided to the control signal generating circuit 15 during the first half of the one-address period. Upon reception of the signal indicating A≦B, the control signal generating circuit 15 inputs no new instruction signal to the buffer memory 12 and the bi-directional buffer memory 13. Therefore, the data of the buffer memory 12 is not replaced, that is, the first line data B remains stored therein.

After the above data renewal operation is performed for all the addresses of one line, the carriage is moved to the next line, and, in the similar manner, the output data A of the next line from the A/D converter 11 is compared with the data B stored in the buffer memory 12 and the data of the buffer memory 12 is replaced. This operation is repeated predetermined times. As a result, the data of each address finally stored in the buffer memory 12 should be the maximum value among the reading data of a plurality of lines.

Figure 4:
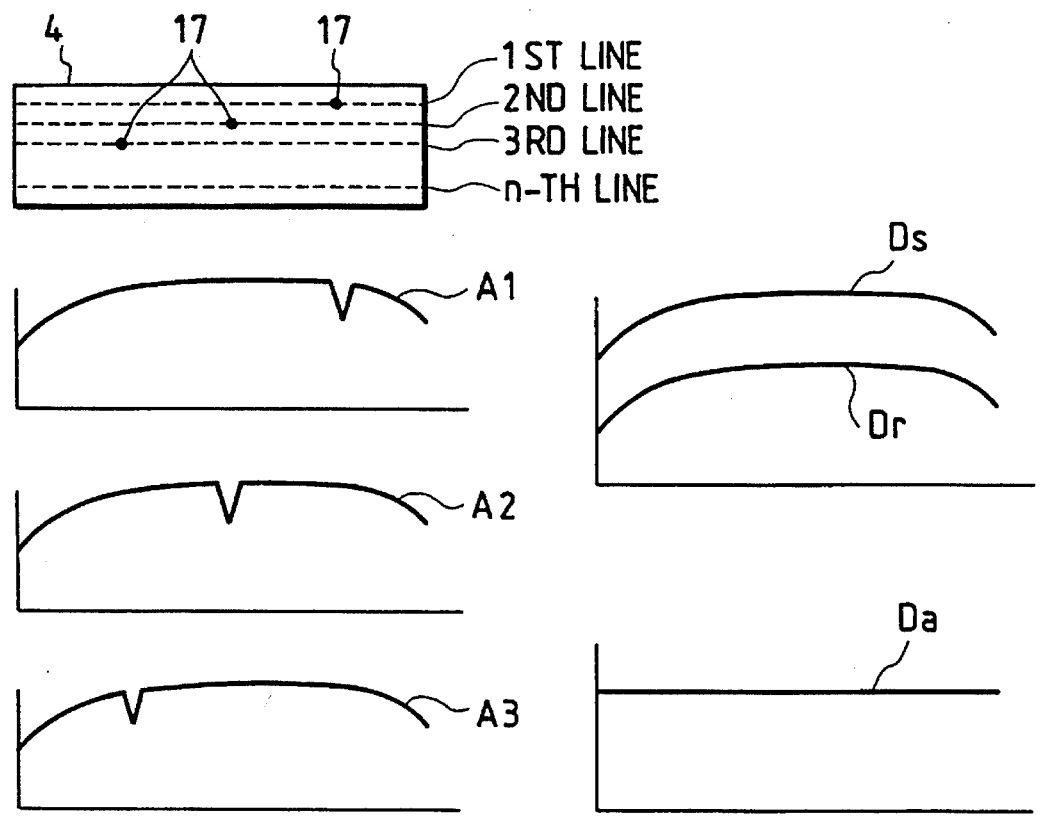
FIG. 4 includes waveforms showing the operation of taking in the shading correction reference data.

As shown in FIG. 4, if defects (scratch, dust, etc.) 17 exist on the first to third lines of the correction plate 4, output data A1, A2, A3 of the A/D converter 11, which have been produced by reading the respective lines, have low-level portions at the positions corresponding to the respective defects 17. However, such low level portions due to the defects 17 do not appear in the final shading correction reference data Ds because they are eliminated through the data renewal of a plurality of times. When a document having a constant density is read to produce smooth output data Dr, output data Da after subjected to the shading correction does not include a noise, producing a good output image.

Upon completion of the comparison and replacement operation of the predetermined times, the control signal generating circuit 15 provides the output-off signal to the A/D converter 11, the read signal RS to the buffer memory 12, and the direction changeover signal CS to the bi-directional buffer 3. As a result, the data flow direction of the bi-directional buffer 13 is changed over to allow the data flow from the buffer memory 12 to the shading correction data memory 16, the data output from the A/D converter 11 is prohibited, and the data is transferred from the buffer memory 12 to the shading correction data memory 16. Where the shading correction is to be performed for black (dark correction) and gray (halftone correction) in addition to white (bright correction), the following operations are performed for each of the black and gray corrections: the data stored in the buffer memory 12 is renewed using an appropriate correction plate 4, and then the final data is transferred to and stored into proper shading correction data memory 16.

Figure 6:
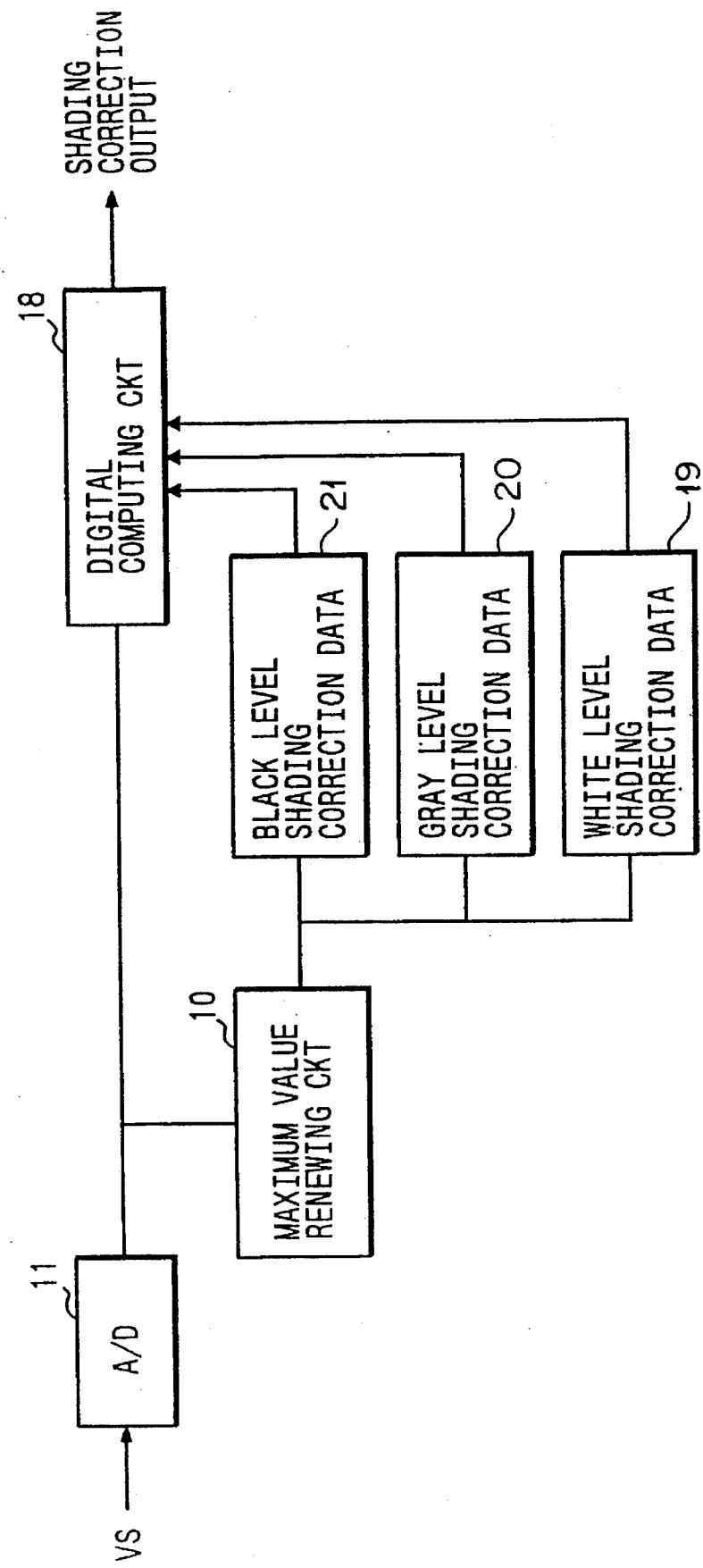
FIG. 6 is a block diagram of the image reading device in which the shading correction is performed for three levels.

Referring to FIG. 6, when the document 3 is read, an analog image signal VS produced from the image sensor 8 is amplified by the amplifier 9, and converted into a digital signal by the A/D converter 11, and then input to a digital computing circuit 18. The digital computing circuit 18 performs shading correction on the data provided from the A/D converter 11 using the shading correction reference data read from the shading correction data memory 16. Where there exist three shading correction data memories 16 as in the case of FIG. 6, three kinds having respective data transmission paths 19, 20, and 21 for shading correction reference data of white, gray and black levels are used.

In the following, a second embodiment of the invention is described with reference to FIGS. 7 and 8.

The second embodiment is different from the first embodiment in that data produced by reading a line of the correction plate 4 which is not defective, i.e., on which no scratch, dust, or the like exists is employed as the shading correction reference data. The basic construction of the device according to the second embodiment is the same as the first embodiment, but some difference exists in the buffer memory 12 and the digital comparator 14.

The buffer memory 12 has a couple of memory areas each capable of storing one-line data produced from the A/D converter 11, and fundamental data is stored in one of the couple of memory areas. The digital comparator 14 compares the output data A of the A/D converter 11 with the fundamental data B of the buffer memory 12 on a pixel-by-pixel basis, and outputs to the CPU a comparison result indicating whether a difference (A−B) is smaller than a predetermined value, and another comparison result indicating whether A is larger than B. Based on the signals provided from the CPU and other signals, the control signal generating circuit 15 generates an output-on/off changeover signal for the A/D converter 11, data read and write signals for the buffer memory 12, and output-on/off and direction changeover signals for the bi-directional buffer 13. The CPU judges whether the difference between the two kinds of data under comparison is not less than a predetermined value for all the pixels. If the judgment is negative, the CPU stores the data B into the shading correction data memory 16. If the judgment is affirmative and the fundamental data B is a smaller one, the CPU replaces the fundamental data B with the data A.

Figure 7:
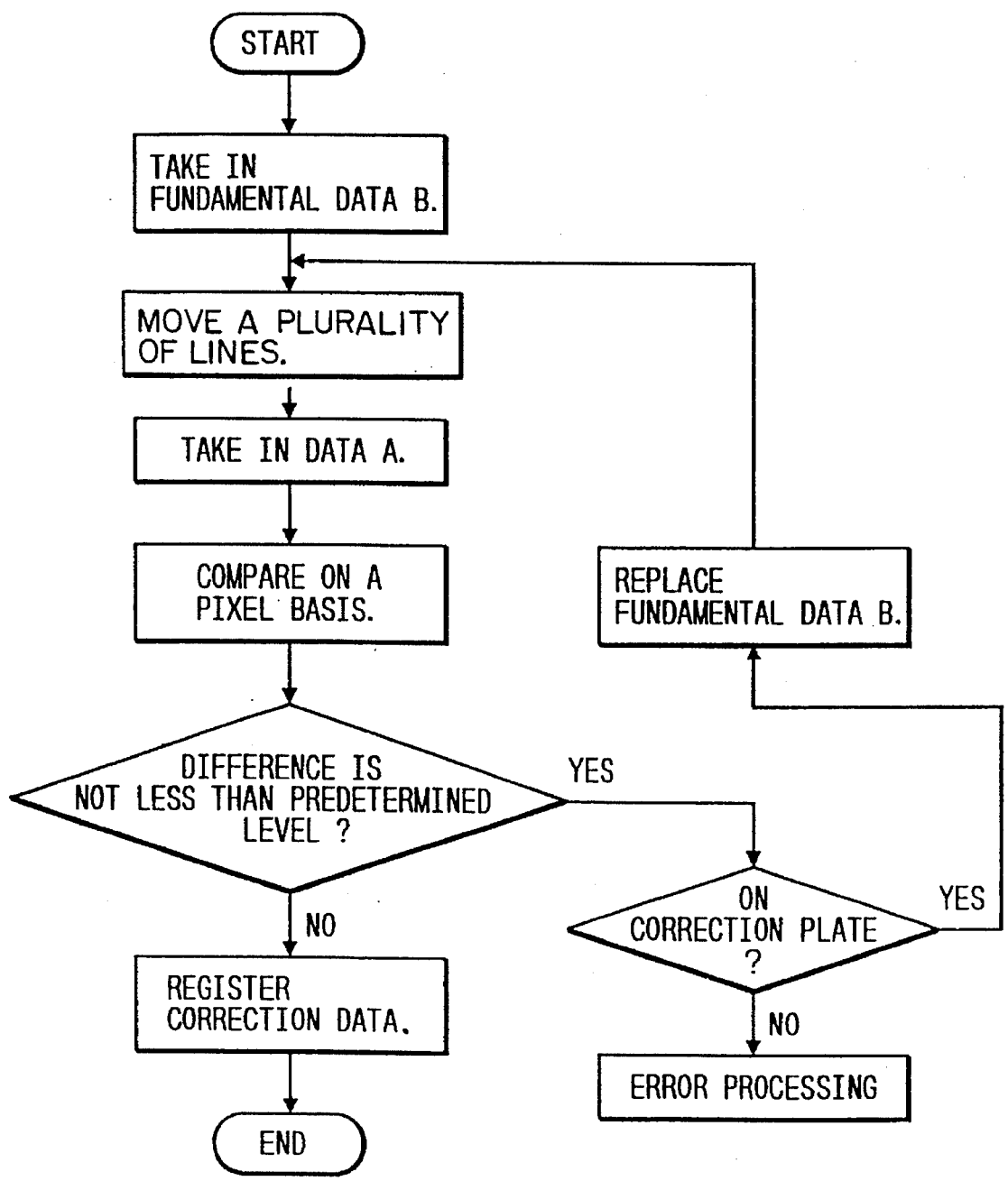
FIG. 7 is a flowchart showing an operation of taking in shading correction reference data in a second embodiment.

Referring to FIG. 7, when the shading correction data memory 16 takes in the shading correction reference data, first the carriage is moved to a prescribed position at which the image sensor 8 faces the correction plate 4. Then, the image sensor 8 reads the first line of the correction plate 4 in the main scanning direction, and a resultant reading signal is sequentially written into the buffer memory 12 as the fundamental data B, in the same manner as in the first embodiment. After reading the first line, the carriage is moved in the sub-scanning direction so as to reach a position apart from the first line by a distance of several lines, and that line of the correction plate 4 is read. The output data A of the A/D converter 11 and the fundamental data B stored in the buffer memory 12 are input to the digital comparator 14, and sequentially compared with each other for all the pixels (addresses).

Figure 8:
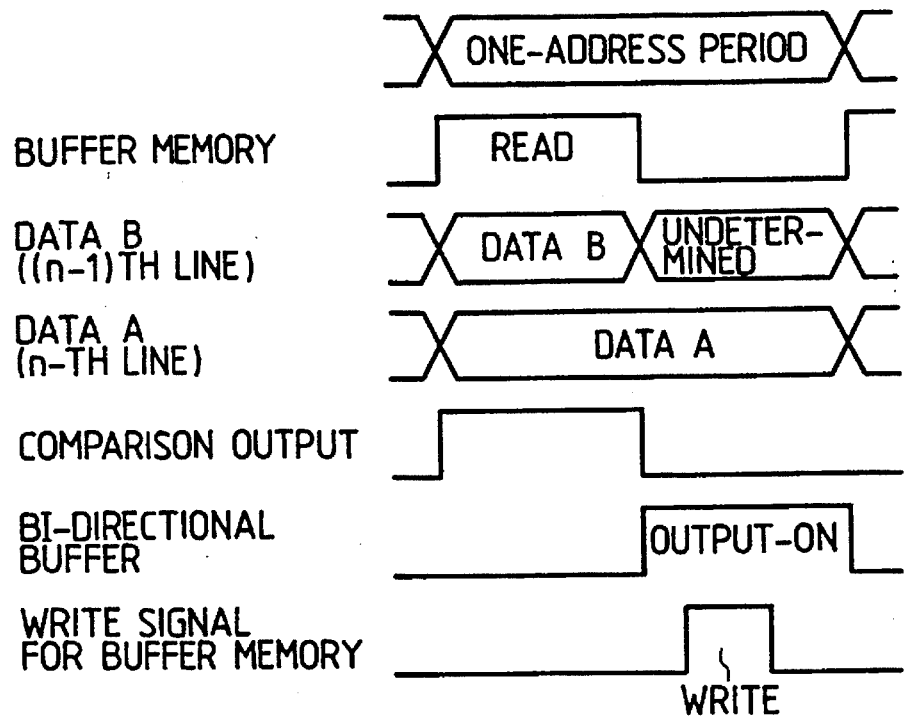
FIG. 8 is a timing chart showing the timing of data comparison and writing.
Figure 9:
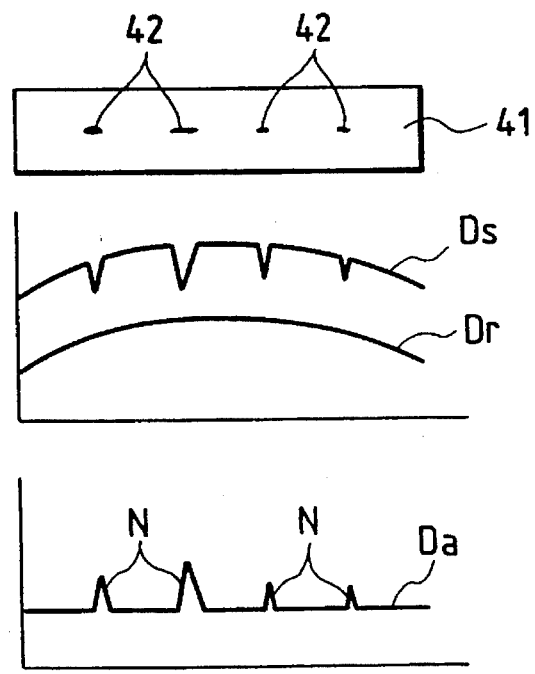
FIG. 9 includes waveforms showing how an image signal is deteriorated in a conventional device.

The comparison between the data A and B and the writing of new data are performed at the timing shown in FIG. 8. As in the case of the first embodiment, during the first half of a one-address period, the fundamental data B read from the buffer memory 12 is input to the digital comparator 14 and compared with the data A. The digital comparator 14 outputs a comparison result indicating whether the difference (A−B) is smaller than a predetermined value, and another comparison result indicating whether A is larger than B. Irrespective of the comparison results of the digital comparator 14, during the second half of the one-address period the control signal generating circuit 16 provides the output-on signal D1 to the bi-directional buffer 13, and the write signal WS to the buffer memory 12. As a result, during the second half of the one-address period, the data A is written into the remaining memory area of the buffer memory 12. After the comparison has been performed for all the addresses, based on the signals provided from the digital comparator 14, the CPU judges that foreign matter such as dust does not exist in either of the reading lines if the difference between the data A and B is smaller than the predetermined value for all the addresses. Because it is a very rare case that a scratch or dust exist on both of the two distant lines only at their identical positions. Then, the CPU sends to the control signal generating circuit 15 an instruction to effect transfer of the fundamental data stored in the buffer memory 12. In response to this instruction, the control signal generating circuit 15 provides the output-off signal to the A/D converter 11, the read signal RS to the buffer memory 12, and the direction changeover signal CS to the bi-directional buffer 13. As a result, the fundamental data B stored in the buffer memory 12 is transferred to the shading correction data memory 16 in the same manner as in the first embodiment.

On the other hand, if there is at least one address which is associated with the data A and B having a difference not less than the predetermined value, it is judged whether the present reading line is located on the correction plate 4. This judgment is done based on a detection signal from a sensor (not shown) for detecting the position of the carriage, the number of times of carriage movement, or other signals. After it is confirmed that the present reading line is located on the correction plate 4, if the data A is larger than the data B for all the addresses which are associated with the data A and B having the difference not less than the predetermined value, the fundamental data B is replaced with the data A newly stored in the buffer memory 12 in response to a signal from the CPU. On the other hand, if there exists at least one address which is associated with the data A that is smaller than the data B among the addresses which are associated with the data A and B having the difference not less than the predetermined value, the fundamental data B is not replaced. Then, the carriage is again moved to the next line that is apart from the previous reading line by several lines, and the operation similar to the above is performed again.

On the other hand, if the reading line is not located on the correction plate 4, error processing is effected. Since the correction plate 4 has so long a length that the correction plate 4 can be read even after the carriage is moved several times, the error processing is effected only after the above-described operation has been performed several times. In the error processing, the carriage is returned and the above operation is again performed starting from a line other than the previous starting line. Where the error processing is required a plurality of times, the above operation is no longer performed. In this case, judging that the correction plate 4 is defective, a warning lamp may be turned on.

After completion of the above operation, reading data which has been obtained by reading a non-defective line of the correction plate 4 is stored in the shading correction data memory 16 as the correction reference data.

The present invention is not limited to the above embodiments. In the second embodiment, for instance, in the data comparison performed by the digital comparator 14, if the signals indicating that the difference between the data A and B is not less than the predetermined value and the fundamental data B is larger than the data A are provided from the digital comparator 14 to the CPU, the comparing operation may be stopped at that time and the carriage may be moved to the next reading line. Further, reading data of different lines on the correction plate 4 may be stored in a memory, and then the stored data may be read out for address-by-address comparison. Still further, although a contact type image sensor is employed as the image sensor 8 in the above embodiments, other image sensors such as a CCD type may be used.

As described in the foregoing, according to the invention, proper shading correction reference data can be obtained without affected by a scratch, dust, etc. existing on the correction plate. Therefore, document images can be reproduced precisely.

What is claimed is:

1. An image reading device for reading an image on an original, comprising:

a platen having an area for holding the original;

a shading correction plate on the platen;

reading means for reading lines of the shading correction plate on the platen and lines of the original on the platen, and for producing signals corresponding to the lines of the shading correction plate on the platen and the lines of the original on the platen respectively;

comparing means for comparing a first signal corresponding to each pixel in a first line read from the shading correction plate by the reading means with a second signal corresponding to each pixel in a second line read by the reading means, the second line being spaced a plurality of lines apart from the first line each pixel in the first and second lines being compared consecutively; and judging means for judging whether the differences between the first and second signals are less than a predetermined value to detect whether a defect exists on the shading correction plate;

wherein the comparison by the comparing means is repeated with different first signals corresponding to different lines of the shading correction plate until the differences between the first and second signals are less than the predetermined value.

2. An image reading device as claimed in claim 1, wherein the second signal corresponds to a line of the shading correction plate.

3. An image reading device as claimed in claim 1, further comprising:

storing means for storing the first signal; and replacing means for replacing the first signal in the storing means with the second signal if the differences between the first and second signals are not less than the predetermined value, and if the second signal is greater than the first signal for all differences not less than the predetermined value.

4. An image reading device as claimed in claim 3, further comprising means for transferring the signal stored in the storing means to a memory to be used as shading correction data when the differences between the first and second signals are less than the predetermined value.

5. An image reading device as claimed in claim 4, wherein the second signal corresponds to a line of the shading correction plate.

6. An image reading device as claimed in claim 5, wherein the shading correction plate has a monotone image.

7. An image reading device as claimed in claim 5, wherein the shading correction plate has a plurality of colors.

8. An image reading device for reading an image on an original, comprising:

a platen having an area for holding the original;

a shading correction plate on the platen;

reading means for reading lines of the shading correction plate on the platen and lines of the original on the platen, and for producing signals corresponding to the lines of the shading correction plate on the platen and the lines of the original on the platen;

comparing means for comparing a first signal corresponding to each pixel in a first line read from the shading correction plate by the reading means with a second signal corresponding to each pixel in a second line read by the reading means, the second line being spaced a plurality of lines apart from the first line each pixel in the first and second lines being compared consecutively; and first judging means for judging whether the differences between the first and second signals are less than a predetermined value to detect whether a defect exists on the shading correction plate;

second judging means for judging whether the second signal corresponds to a line of the shading correction plate or a line of the original;

wherein the comparison by the comparing means is repeated with different first signals corresponding to different lines of the shading correction plate until the differences between the first and second signals are less than the predetermined value.

9. An image reading device as claimed in claim 8, further comprising:

storing means for storing the first signal; and replacing means for replacing the first signal in the storing means with the second signal if the second signal corresponds to a line of the shading correction plate, if the differences between the first and second signals are not less than the predetermined value, and if the second signal is greater than the first signal for all differences not less than the predetermined value.

10. An image reading device as claimed in claim 9, further comprising means for transferring the signal stored in the storing means to a memory to be used as shading correction data when the differences between the first and second signals are less than the predetermined value.

11. An image reading device as claimed in claim 10, wherein the shading correction plate has a monotone image.

12. An image reading device as claimed in claim 10, wherein the shading correction plate has a plurality of colors.

13. A method for reading an image on an original, comprising the steps of:

providing a shading correction plate;

reading a first line of the shading correction plate;

storing the first line in a memory;

reading a second line spaced apart from the first line by a plurality of lines;

determining whether the second line is from the shading correction plate or the original;

comparing each pixel in the first line with each pixel in the second line in consecutive order; and determining whether the differences between the first and second lines are less than a predetermined value to detect whether a defect exists on the shading correction plate.

14. A method as claimed in claim 13, further comprising the step of replacing the first line in the memory with the second line if the second line corresponds to a line of the shading correction plate, if the differences between the first and second lines are not less than the predetermined value, and if the second line is greater than the first line for all differences not less than the predetermined value.

* * * * *